US011601869B2

(12) United States Patent
Liao et al.

(10) Patent No.: US 11,601,869 B2
(45) Date of Patent: Mar. 7, 2023

(54) NON-PUBLIC NETWORK DISCOVERY, SELECTION, AND ACCESS CONTROL IN VERTICAL DOMAIN

(71) Applicant: APPLE INC., Cupertino, CA (US)

(72) Inventors: Ching-Yu Liao, Portland, OR (US); Puneet Jain, Hillsboro, OR (US); Alexandre Saso Stojanovski, Paris (FR); Meghashree Dattatri Kedalagudde, Portland, OR (US)

(73) Assignee: APPLE INC., Cupertino, CA (US)

( * ) Notice: Subject to any disclaimer, the term of this patent is extended or adjusted under 35 U.S.C. 154(b) by 22 days.

(21) Appl. No.: 17/280,976

(22) PCT Filed: Oct. 2, 2019

(86) PCT No.: PCT/US2019/054309
§ 371 (c)(1),
(2) Date: Mar. 29, 2021

(87) PCT Pub. No.: WO2020/072657
PCT Pub. Date: Apr. 9, 2020

(65) Prior Publication Data
US 2021/0345226 A1    Nov. 4, 2021

Related U.S. Application Data

(60) Provisional application No. 62/740,694, filed on Oct. 3, 2018.

(51) Int. Cl.
*H04W 48/10*      (2009.01)
*H04W 48/16*      (2009.01)

(52) U.S. Cl.
CPC .......... *H04W 48/10* (2013.01); *H04W 48/16* (2013.01)

(58) Field of Classification Search
CPC ...... H04W 48/10; H04W 48/16; H04W 48/18
See application file for complete search history.

(56) References Cited

U.S. PATENT DOCUMENTS

| 9,882,968 | B1 * | 1/2018 | Holgers | ............... | G06F 9/45533 |
| 2018/0041935 | A1 * | 2/2018 | Jung | ..................... | H04W 48/18 |
| 2018/0376411 | A1 * | 12/2018 | Rinne | ................... | H04W 76/27 |

FOREIGN PATENT DOCUMENTS

| KR | 101691761 B1 | 12/2016 |
| WO | 2017103256 A1 | 6/2017 |
| WO | 2018093948 A1 | 5/2018 |

OTHER PUBLICATIONS

3GPP TR 23.734, et al.,"3rd Generation Partnership Project; Technical Specification Group Services and System Aspects; Study on 5GS Enhanced support of Vertical and LAN Services (Release 16)", V0.2.0 ,Sep. 2018 ,39 pages.
(Continued)

*Primary Examiner* — Qutbuddin Ghulamali
(74) *Attorney, Agent, or Firm* — Dorsey & Whitney LLP

(57) ABSTRACT

In one embodiment, an apparatus of a User Equipment (UE) device includes memory storing non-public network (NPN) configuration information, a radio frequency (RF) interface, and processing circuitry coupled to the memory and the RF interface. The RF interface receives information broadcast by a radio access network (RAN) node of the particular NPN, where the information includes a NPN indicator indicating that the RAN node supports a NPN and NPN service information indicating services supported by the particular NPN. The processing circuitry establishes, in response to detecting the NPN indicator in the information received from the RAN node, a connection to the particular NPN based on the NPN configuration information and the NPN service information received from the RAN node.

15 Claims, 6 Drawing Sheets

(56) References Cited

OTHER PUBLICATIONS

Nokia, Nokia Shanghai Bell, et al.,"Enhanced network slice requirements based on business role models, S1-182771, 3GPP TSG-SA WG1 Meeting #83, West Palm Beach, FL, USA (revision of S1-182469) (revision of S1-182238)", Aug. 20-24, 2018 ,6 pages.
PCT/US2019/054309, et al., International Search Report and Written Opinion ,dated Jan. 15, 2020 ,13 pages.

* cited by examiner

NON-PUBLIC NETWORK DISCOVERY, SELECTION, AND ACCESS CONTROL IN VERTICAL DOMAIN

CROSS REFERENCE TO RELATED APPLICATIONS

This application is a national stage filing under 35 U.S.C. § 371 of International Patent Application No. PCT/US2019/054309, filed Oct. 2, 2019 which claims the benefit of and priority from U.S. Provisional Patent Application No. 62/740,694, filed Oct. 3, 2018, the entire disclosure of each of which is hereby incorporated herein by reference.

TECHNICAL FIELD

This disclosure generally relates to network discovery, selection, and access control in the field of wireless communications.

BACKGROUND

Current wireless communication networks, such as third generation (3G) and fourth generation (4G) networks, have little to no support for enhanced Vertical and local area network (LAN) services. Mechanisms are needed to provide enhanced Vertical and LAN services in upcoming fifth generation (5G) wireless communication networks.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and processes are omitted so as not to obscure the description of the various embodiments with unnecessary detail. For the purposes of the present document, the phrase "A or B" means (A), (B), or (A and B).

Figure 1:
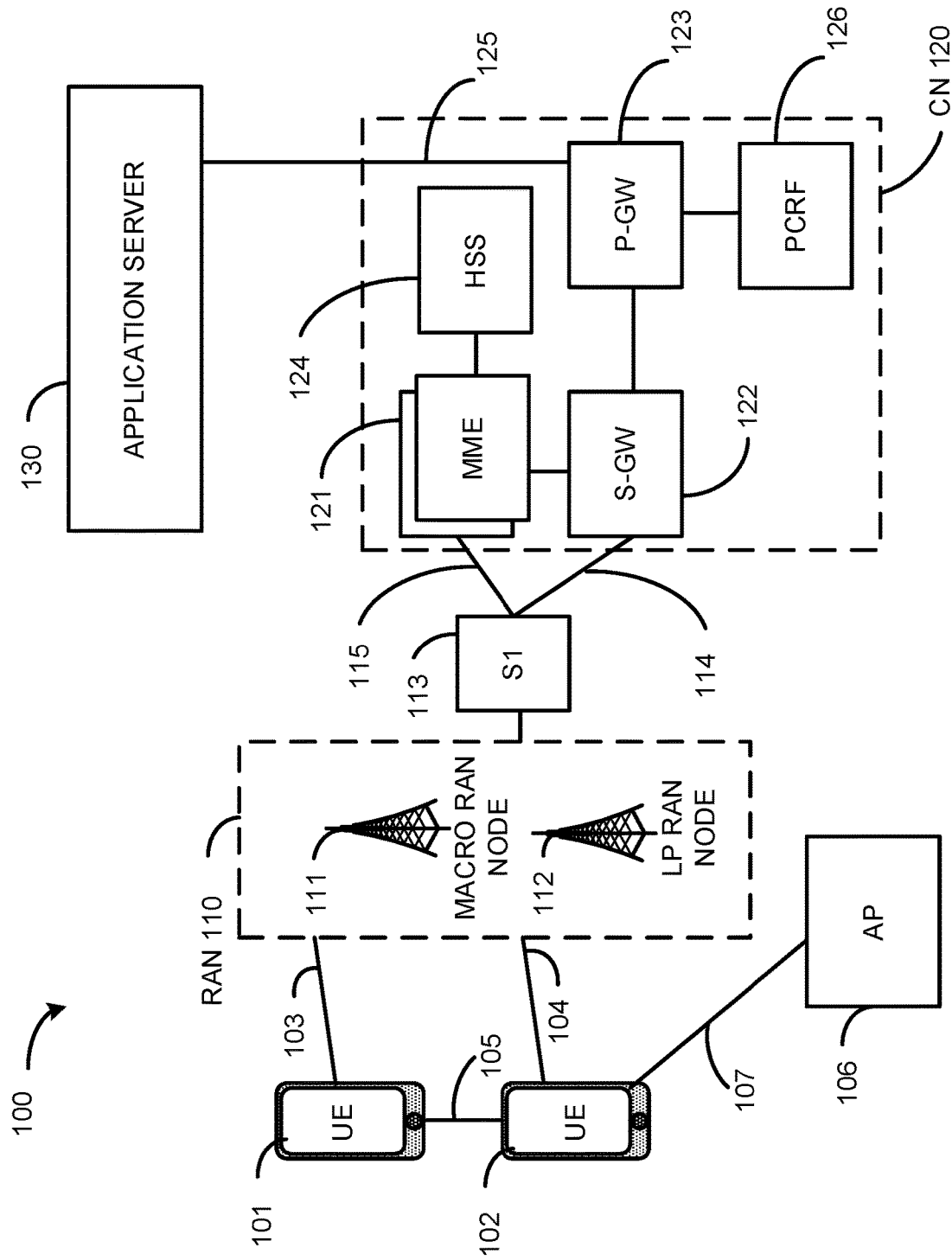
FIG. 1 illustrates an architecture of a system of a network in accordance with some embodiments.

FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110 The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol.

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124.

Figure 2:
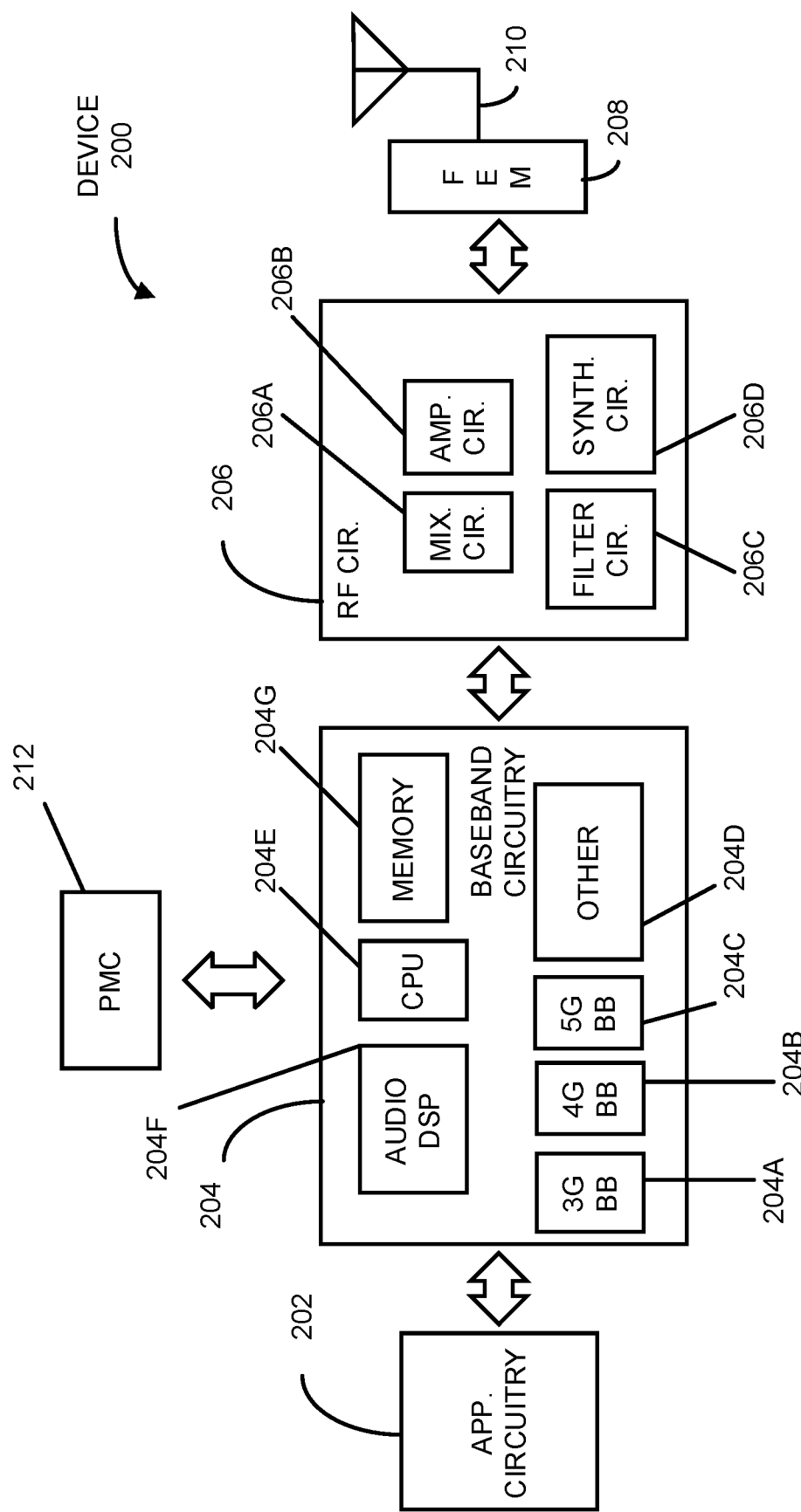
FIG. 2 illustrates example components of a device in accordance with some embodiments.

FIG. 2 illustrates example components of a device 200 in accordance with some embodiments. In some embodiments, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some embodiments, the device 200 may include less elements (e.g., a RAN node may not utilize application circuitry 202, and instead include a processor/controller to process IP data received from an EPC). In some embodiments, the device 200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 202 may include one or more application processors. The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. The baseband circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

RF circuitry 206 may enable communication with wireless networks using modulated electromagnetic radiation through a non-solid medium. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the receive signal path of the RF circuitry 206 may include mixer circuitry 206a, amplifier circuitry 206b and filter circuitry 206c. In some embodiments, the transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various embodiments, the amplification through the transmit or receive signal paths may be done solely in the RF circuitry 206, solely in the FEM circuitry 208, or in both the RF circuitry 206 and the FEM circuitry 208.

In some embodiments, the FEM circuitry 208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 may manage power provided to the baseband circuitry 204.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 202 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below. The 5G system may support non-public networks. The supported non-public networks may provide coverage within a specific geographic area and may include both physical and virtual non-public networks. The 5G system may support standalone operation of a non-public network, i.e. a non-public network may be able to operate without dependency on a public land mobile network (PLMN).

Subject to an agreement between operators and service providers, operator policies and the regional or national regulatory requirements, the 5G system may provide support for non-public network subscribers to: access subscribed PLMN services via the non-public network; provide service continuity for subscribed PLMN services between a non-public network and a PLMN; access selected non-public network services via a PLMN; and/or provide service continuity for non-public network services between a non-public network and a PLMN.

A non-public network subscriber to access a PLMN service may have a service subscription using 3GPP identifiers and credentials provided or accepted by a PLMN.

The 5G system may support a mechanism for a UE to identify and select a non-public network. In certain embodiments, different network selection mechanisms may be used for physical versus virtual non-public networks. The 5G system may support identifiers for a large number of non-public networks to minimize collision likelihood between assigned identifiers. The 5G system shall may support a mechanism to prevent a UE with a subscription to a non-public network from automatically selecting and attaching to a PLMN or non-public network it is not authorized to select. The 5G system may also support a mechanism to prevent a UE with a subscription to a PLMN from automatically selecting and attaching to a non-public network it is not authorized to select.

The present disclosure considers a non-public network (NPN), which can be a self-contained network or interworking with one or more service networks (which may be operated by one or more mobile network operators (MNO)s providing PLMN services or third-party service network operators (SNO)). An NPN may refer to a 3GPP network that is not for public use and for which service continuity and roaming with a public PLMN is possible, or to an isolated 3GPP network that does not interact with a public PLMN. NPNs may be considered "non-public" because they may be accessed only by UEs with appropriate NPN configuration information as described herein.

Aspects of the present disclosure may provide solutions to the following issues that arise in the context of NPNs: (1) NPN subscriptions; (2) How information identifying an NPN is provided to the UE for network discovery and selection; (3) Which criteria are used by the UE for automatic selection of NPNs; (4) How to support manual selection of NPNs; (5) How to prevent UEs not authorized for a given NPN from attempting to automatically select and register in that NPN; (6) How to enable the network to verify whether a UE is authorized to access an NPN; (7) Which network entities perform access control for NPNs; (8) Access barring aspects for NPNs; (9) Where access restrictions are configured (e.g. subscription or configuration); (10) How to enable UEs to access certain NPNs but prevent the same UEs from accessing public PLMNs; (11) How to prevent UEs not supporting NPNs from attempting to access NPNs; (12) How to prevent NG-RAN from handing over a UE to a certain NPN if the UE is not permitted to access the NPN; (13) What are the information elements included in the network identification and what is the granularity of each information, e.g. network operator identifier, type of the network, location information; (14) What are the assumption on the uniqueness of the network identification; and/or (15) Whether and how is the network identification related to the UE identification.

Current solutions include some studies in MulteFire, which may provide the methods for interworking a Multe-Fire network with LTE+EPC. However, some of the issues indicated above have not been resolved yet in these solutions, and the methods used for EPS may not be applicable for 5GS. In contrast, the embodiments herein may provide comprehensive solutions in support of different deployment options for enabling services in PLMN domain or vertical domain for the 5GS UE capable of NPN communication. Further, the present disclosure provides mechanisms to resolve the abovementioned open issues for network identification, network discovery and selection, as well as the access control. In support of NPN access for a UE, embodiments include a set of UE configuration parameters in NPN network service profile, and design principles for NPN identification and service network identification which can be used for the UE to perform PLMN selection, network discovery and selection based on configured NPN service profile.

For purposes of the present disclosure, for certain networks, the interworking service networks (e.g., service networks 314, 316 of FIG. 3) are 5GS PLMNs. The interworking system architecture may be of another type, however. In some cases, the fundamental system architecture and UE Configuration. Update procedure is assumed to supported and used in an NPN according to 3GPP TS 23.501, 502, and 503.

Figure 3:
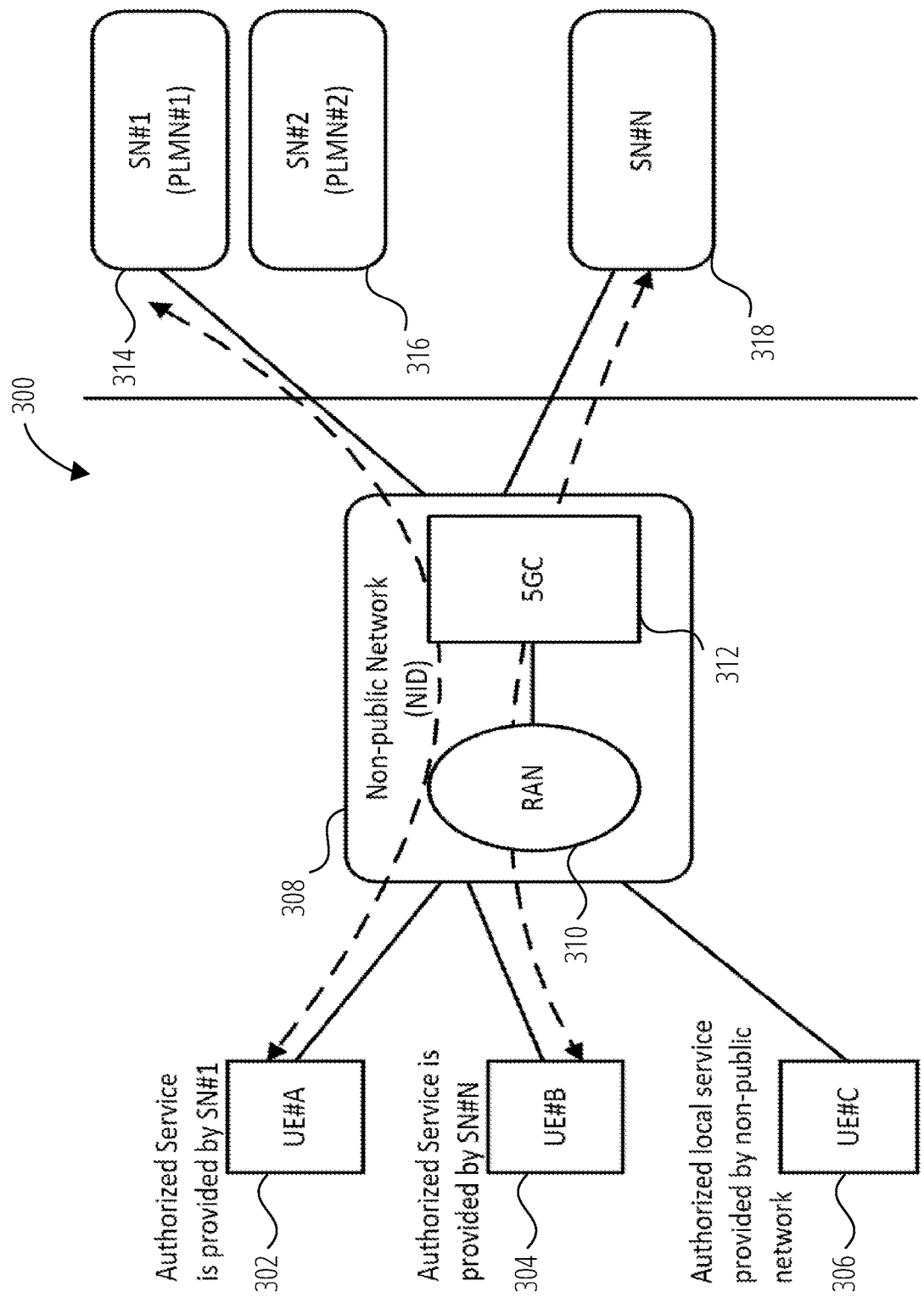
FIG. 3 is a diagram showing example user equipment (UE) connected to a non-public network in accordance with some embodiments.

A non-public network may support services provided by one or more Service Network (SN) providers, which can include MNOs, or third-party service provider. FIG. 3 is a diagram showing example UE 302 (UE#A), UE 304 (UE#B), and UE 306 (UE#C) connected to a non-public network (NPN) 308 in accordance with some embodiments. In particular, FIG. 3 shows an example NPN and various use cases, such as where the NPN 308 is a self-contained network (e.g., for UE 306) or the case where the NPN 308 provides interaction with external service networks (e.g., for UEs 302, 304). In the example shown, the UEs may access local/non-public network services (e.g., the Internet) via the NPN 308, or may access external services (e.g., through service networks 314, 316, 318) via the NPN 308. The service network 314 (SN#1 or PLMN#1), service network 316 (SN#2 or PLMN#2), and 318 (SN#N) may be third-party networks, and in some cases, may be public land mobile networks (PLMNs) that provide mobile cellular services according to the 3GPP TR 21.905.

In this example, the UE 302 (UE#A), the UE 304 (UE#B), and the UE 306 (UE#C) are registered to the non-public network 308 identified by a non-public network ID (NID). Service network 314 (represented by SN#1 or PLMN#1), which is an MNO, provides the authorized service for the UE 302 (UE#A) through a RAN node 310 and the 5G core (5GC) 312. Service provider 318 (represented by SN#N), which is a third-party service provider, provides the authorized service for the UE 304 (UE#B) through the RAN node 310 and the 5GC 312. The UE 306 (UE#C) is connected to a standalone non-public network identified by the NID. The standalone non-public network provides local services to the UEs registered to the non-public network. For example, in a factory or enterprise. For non-public network identification, according to one embodiment, the network identification of the non-public network 308 may be able to support external services or local services and may have the same format of the network identification, which is defined as the NID. The NID of the non-public network 308 may be able to indicate the support of external service networks (e.g., SN#1, SN#N) or local service (e.g., as a self-contained private network).

In certain such embodiments, the non-public network may provide information on a list of supported external service networks (e.g., SN#1, SN#N), which can be identified by a service network identification defined as a service network identifier (SN-ID). The SN-ID of the service network may be able to indicate the support of MNO with the format PLMN-ID. A given non-public network identified by NID may be assumed to support the same set of SN-ID. For a service provider that is an MNO, the SN-ID may comprise a PLMN-ID. For a service provider that is not an MNO, the SN-ID may be a domain name and a selection procedure may be based on domain names.

In certain embodiments, if the UE is not configured with any SN-ID, then the NID may be sufficient to identify a non-public network.

In certain embodiments, the RAN node 310 in the non-public network 308 may broadcast information including a non-public network indication (or NPN indicator), the NID, and a supported SN-IDs list. The UEs 302, 304, and/or 306 may be configured with information including an SN-IDs list in priority order, authentication parameters (e.g., including credential and authentication method of a configured SN-ID), Data Network Name (DNN), Single Network Slice Selection Assistance Information (S-NSSAI), and Session and Service Continuity (SSC) of the configured SN-ID if network slicing is supported in the service network. In one embodiment, a unified data management (UDM) function or other function in the 5GC 512 stores information such as the NID and list of SN-IDs that a UE is authorized to use. The UDM or other function may store the information, for example, as part of a UE's subscription parameter.

Embodiments herein provide mechanisms for UEs to access an NPN using the following principles for NPN identification: (1) the NPN may have the same format of the network identification, defined as NID; (2) NID of the NPN may be able to indicate the support of external service network, e.g. SN#1, . . . , SN#N, or non-public network service, e.g. as a self-contained private network; (3) the NPN may provide information of the supported external service network, e.g. SN#1, SN#N, which can be identified by a service network identification, defined as SN-ID; (4) SN-ID of the service network may be able to indicate the support of MNO which is with the format of PLMN-ID (e.g., indicating a mobile country code (MCC) and mobile network code (MNC)), and other Service Network Operators (SNO); (5) the RAN node in the NPN may broadcast the following information: (a) NID; and/or (b) Supported SN-IDs list; (6) the UE may be configured with the following information in NPN profile: (a) SN-IDs list in priority order; (b) Authentication parameters including credential, authentication method of the configured SN-ID; and/or (c) DNN, S-NSSAI, SSC mode of the configured SN-ID.

Network Discovery and Selection

For a UE configured with an NPN profile, it may be useful for the NPN discovery and selection to be compatible with existing PLMN selection procedure, e.g. as in 3GPP TS 23.122/TS 36.304. For example, when a UE is switched on, a PLMN is selected by NAS, and on request of the NAS, the AS may perform a search for available PLMNs with CN type if available for each PLMN and report them to NAS. Thus, a UE may need to be able to select a PLMN-ID that is only used for the NPN, and the NPN selection procedure may need to be able to provide information for the UE to differentiate if external services are provided via a service network or non-public network service is supported.

Embodiments herein provide mechanisms for UEs to access an NPN using the following principles for NPN discovery and selection. In the PLMN selection procedure, a non-public network indicator may be used as an indication to differentiate between the PLMN and NPN. The RAN node in the NPN may broadcast the non-public network indicator along with other supported PLMNs, if available, in the system information. The non-public network indicator can be either a new indicator broadcast in a system information block (SIB) or a reserved globally unique PLMN ID. It is noted that the information broadcast by the RAN node for NPN may have RAN dependency.

For the UE configured with non-public network information, when the UE detects the non-public network indicator, the UE continues with the NPN Discovery and Selection procedure. In one embodiment for the NPN selection procedure, if external services are supported, NPN selection can be based on the information with combination of SNID+NID, and if local services of the NPN are supported, NPN selection can only be based on NID.

In some embodiments, the following two options can be used to indicate to the UE if the NPN supports external services or only local services. First (option 1), two unique non-public indicators may be allocated to represent two types of NPN selection procedure, one for external service and another for local service of the NPN. Second (option 2), NID includes an indication, which is used to differentiate if associated service is provided by the external service network or local service network.

Access Control

Embodiments herein provide mechanisms for UEs to access an NPN using access class information may be stored in a Universal Subscriber Identity Module (USIM) or as a part of the configuration of the NPN Profile. The UE may be also configured with the access class information corresponding to the configured SN-ID. Access control of the NPN may be based on the RAN node of the NPN broadcasting information of the allow/non-allowed access class of the Service Network identified by the SN-ID.

Example Procedures

In certain embodiments, the non-public network uses a UE Configuration Update procedure (e.g., as in 3GPP TS 23.501) to configure a non-public network profile for the UE with SN-IDs list in priority order. For each SN-ID in the configured SN-IDs list, the following parameters may be provided: authentication parameters including credential and authentication method; Access Class; and/or DNN, S-NSSAI, SSC mode if network slicing is supported in Service network.

For the non-public network discovery with external service support, an example procedure may include: a UE autonomously scans applicable frequency bands for cells of the 3GPP network and the non-public network; the UE detects that the cell supports non-public network based on the non-public network indicator; and the UE identifies the NID and the list of SN-IDs supported by the non-public network identified by NID.

For the non-public network selection, an example procedure may include: a UE detects a match between configured SN-IDs and available SN-IDs; the UE selects the SN-ID among the discovered SN-IDs based on the prioritized list of configured SN-IDs; and the UE connects to a NID serving the Service Network identified as SN-ID and then perform corresponding authentication procedures.

Figure 4A:
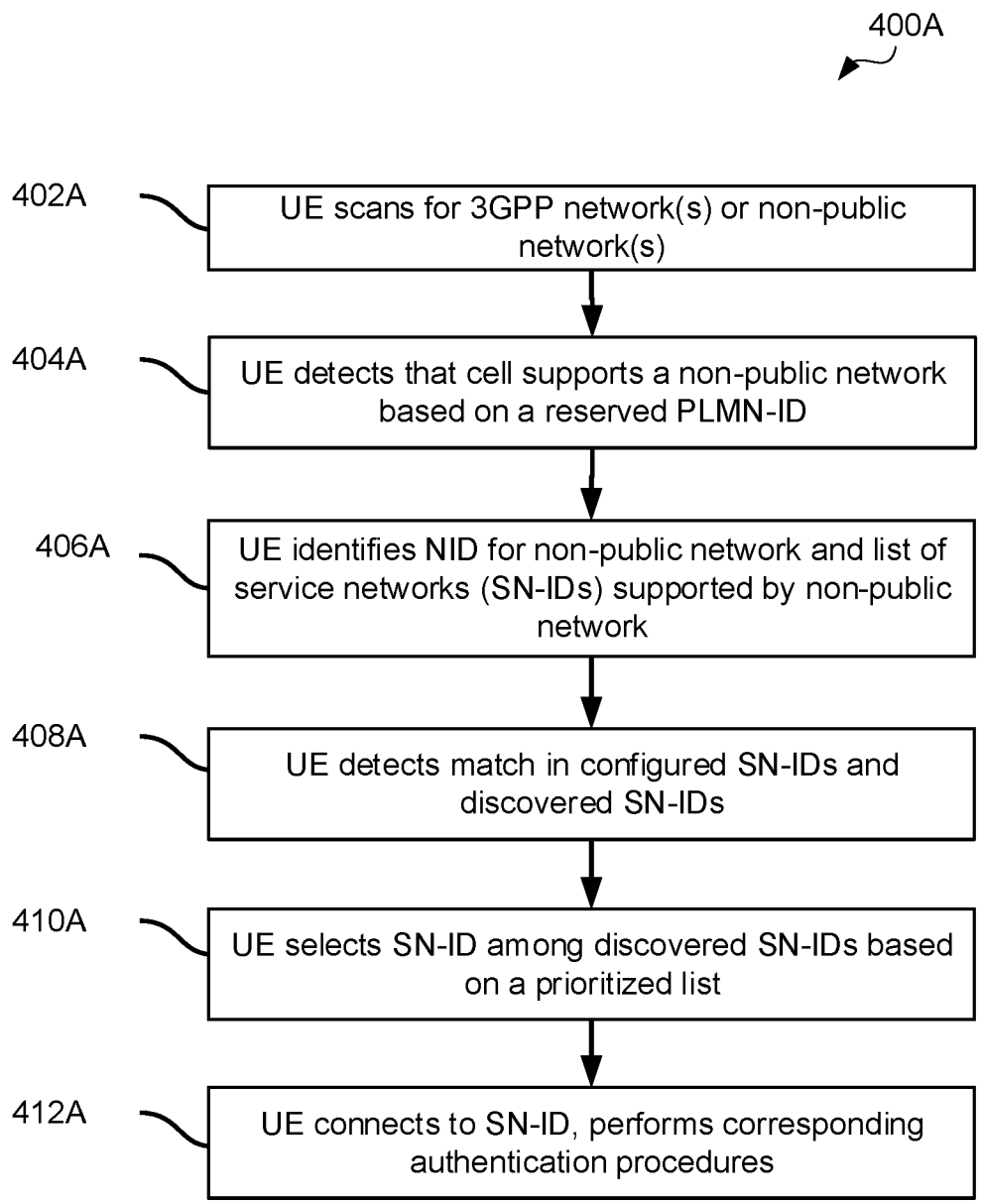
FIGS. 4A-4C are flow diagrams showing example processes of NPN discovery and selection in accordance with some embodiments.
Figure 4B:
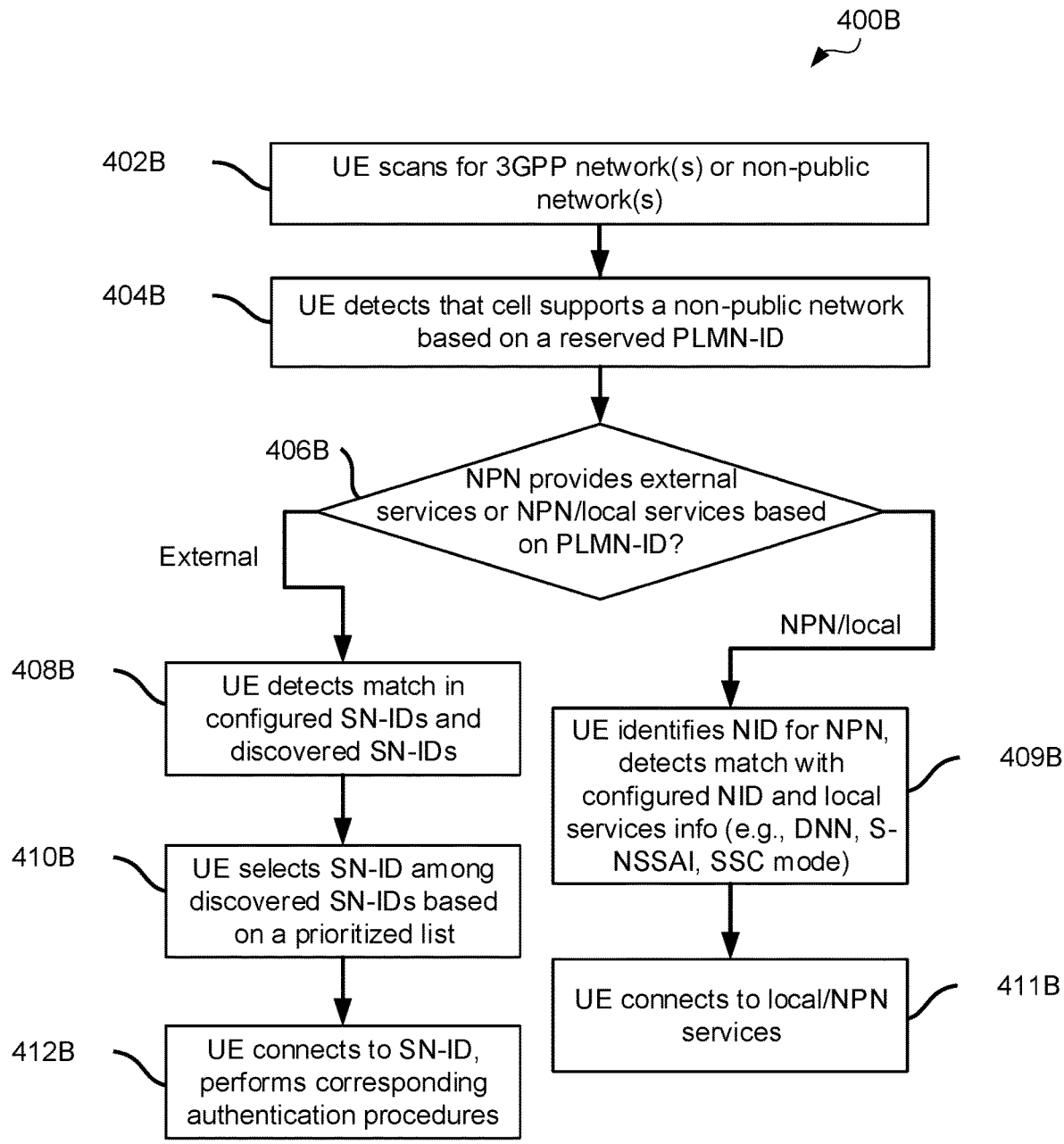
Figure 4C:
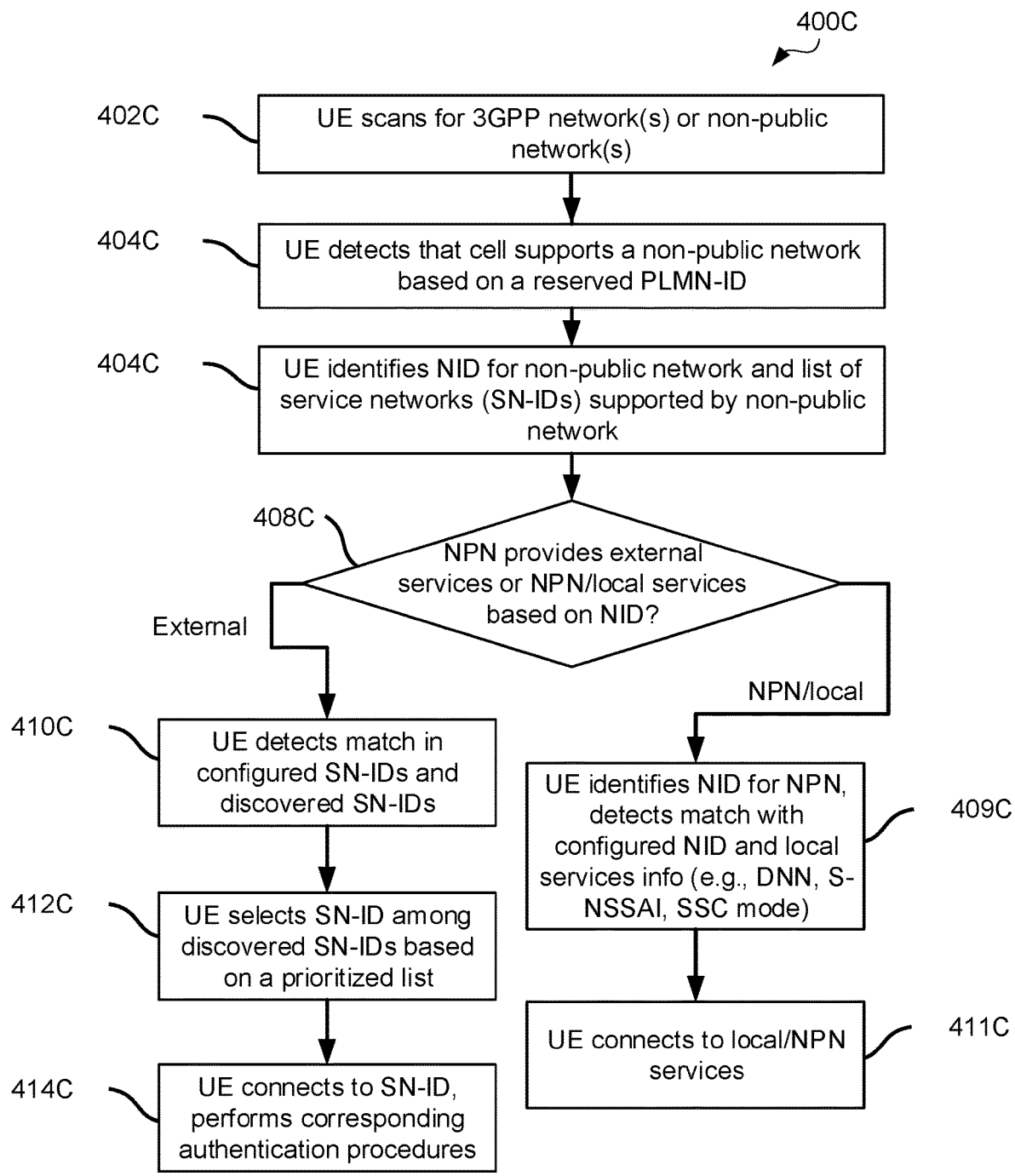

FIGS. 4A-4C are flow diagrams showing example processes 400 of NPN discovery and selection in accordance with some embodiments. Operations in the example process 400 may be performed by one or more components of a UE device (e.g., one or more components the baseband circuitry 204 of FIG. 2), and, in certain cases, may be encoded in computer-readable media as instructions executable by processing circuitry of at least one processor. The example processes 400 may include additional or different operations, and the operations may be performed in the order shown or in another order. In some cases, one or more of the operations shown in FIGS. 4A-4C are implemented as processes that include multiple operations, sub-processes, or other types of routines. In some cases, operations can be combined, performed in another order, performed in parallel, iterated, or otherwise repeated or performed another manner.

In one embodiment (embodiment 4.1, shown in FIG. 4A), the following example procedure may be used for discovery of an NPN with external service support. A UE autonomously scans applicable frequency bands for cells of 3GPP Network(s) and NPN(s) at 402A, detects that a cell supports an NPN based on the reserved PLMN-ID (broadcast by the cell) at 404A, and identifies the NID and the list of service networks (e.g., SN-IDs) supported by the NPN identified by NID at 406A. For the NPN Selection, the example procedure may be used. The UE detects a match between configured SN-IDs and available SN-IDs at 408A, selects the SN-ID among the discovered SN-IDs based on the prioritized list of configured SN-IDs at 410A, connects to a NID serving the Service Network identified as SN-ID and performs corresponding authentication procedures at 412A.

In another embodiment (embodiment 4.2, shown in FIG. 4B): for NPN Discovery where different reserved PLMN-IDs indicate support of non-public network service or external service in NPN), the following example procedure may be used. The UE autonomously scans applicable frequency bands for cells of 3GPP Network(s) and NPN(s) at 402B, and detects that a cell supports NPN based on the reserved PLMN-ID (broadcast by the cell) at 404B. Based on the reserved PLMN-ID, the UE determines at 406B if the detected NPN provides external services or non-public network services. If the reserved PLMN-ID indicates external services are provided by the NPN, the UE performs NPN discovery steps 408B, 410B, 412B (the same as steps 408A, 410A, 412A, respectively, described above with respect to Embodiment 4.1). If, however, the reserved PLMN-ID indicates the NPN provides local, non-public network services, the UE may identify the NID and detect a match between a configured NID for the UE and optional configured non-public network service information (e.g. DNN, S-NSSAI, SSC mode, etc.) at 409B, and connects to the local/NPN services at 411B.

In another embodiment (embodiment 4.3, shown in FIG. 4C), for NPN Discovery where a bit (e.g., first bit) in NID indicates the support of non-public network service or external service in NPN), the following example procedure may be used. The UE autonomously scans applicable frequency bands for cells of 3GPP Network(s) and NPN(s) at 402C, detects that a cell supports NPN based on the reserved PLMN-ID at 404C, and identifies the NID and the list of SN-IDs supported by the NPN identified by NID at 406C. Based on the first bit of the NID, UE determines at 408C whether the NPN provides external services or local/non-public network services. If NID indicates support for external service, the UE performs NPN discovery steps 410C, 412C, 414C (the same as steps 408A, 410A, 412A, respectively, described above with respect to Embodiment 4.1). If, however, NID indicates support for non-public network services, the UE may identify the NID (skipping the detection of SN-IDs list and NPN selection procedure) at 409C, detect a match between configured NID and optional configured non-public network service information (e.g. DNN, S-NSSAI, SSC mode, etc.) at 411C, and connect to the local/NPN services at 411C.

Functions, operations, components and/or features described herein with reference to one or more embodiments, may be combined with, or may be utilized in combination with, one or more other functions, operations, components and/or features described herein with reference to one or more other embodiments, or vice versa.

Examples

The following examples pertain to further embodiments. It will be understood that certain examples listed below may be combined with other examples, or certain aspects of other examples. The examples listed below may be or implemented in or performed by one or more components of a User Equipment (UE) device (e.g., one or more components the baseband circuitry 204 of FIG. 2 implemented in a UE device).

Example 1 is a computer-readable storage medium. The computer-readable storage medium includes instructions that when executed by a processor, cause the processor to: generate a non-public network identifier (NID) configured to identify the non-public network and to indicate support of either an external service network or a local service; generate a list of supported external service networks, wherein the list comprises service network identifiers (SN-IDs) corresponding to respective external service networks in the list; and broadcast information comprising the NID, the list of supported external service networks, and a non-public network indicator to differentiate between the non-public network and a public land mobile network (PLMN).

Example 2 is the computer-readable storage medium of Example 1, wherein a first external service network of the external service networks in the list corresponds to a mobile network operator (MNO) providing PLMN services, and wherein a first SN-ID in the list indicates support of the MNO with a PLMN identifier (PLMN-ID) format.

Example 3 is the computer-readable storage medium of Example 2, wherein a second external service network of the external service networks in the list corresponds to a non-MNO, and wherein a second SN-ID in the list comprises a domain name corresponding to the second external service network.

Example 4 is the computer-readable storage medium of Example 1, wherein to broadcast the information comprises to include the information in a system information block (SIB).

Example 5 is the computer-readable storage medium of Example 1, wherein to broadcast the information comprises to configure a reserved globally unique PLMN identifier (PLMN-ID).

Example 6 is the computer-readable storage medium of Example 1, wherein the instructions further configure the processor to provide local services to one or more user equipments (UEs) registered with the non-public network.

Example 7 is an apparatus for a non-public network. The apparatus includes a memory interface and a processor. The memory interface to send or receive, to or from a memory device, data corresponding to a list of supported external service networks. The processor to: generate a non-public network identifier (NID) configured to identify the non-public network and to indicate support of either an external service network or a local service; generate the list of supported external service networks, wherein the list comprises service network identifiers (SN-IDs) corresponding to respective external service networks in the list; and broadcast information comprising the NID, the list of supported external service networks, and a non-public network indicator to differentiate between the non-public network and a public land mobile network (PLMN).

Example 8 is the computing apparatus of Example 7, wherein a first external service network of the external service networks in the list corresponds to a mobile network operator (MNO) providing PLMN services, and wherein a first SN-ID in the list indicates support of the MNO with a PLMN identifier (PLMN-ID) format.

Example 9 is the computing apparatus of Example 8, wherein a second external service network of the external service networks in the list corresponds to a non-MNO, and wherein a second SN-ID in the list comprises a domain name corresponding to the second external service network.

Example 10 is the computing apparatus of Example 7, wherein to broadcast the information comprises to include the information in a system information block (SIB).

Example 11 is the computing apparatus of Example 7, wherein to broadcast the information comprises to configure a reserved globally unique PLMN identifier (PLMN-ID).

Example 12 is the computing apparatus of Example 7, wherein the processor is further configured to provide local services to one or more user equipments (UEs) registered with the non-public network.

Example 13 is a method for a user equipment (UE), comprising: scanning frequency bands for a wireless wide area network (WWAN) and a non-public network (NPN); detecting a cell that supports the NPN based on an NPN indicator broadcast by the cell; in response to detecting the cell that supports the NPN, determining a network identifier (NID) for the NPN and a list of service network identifiers (SN-IDs) supported by the NPN; and selecting the NPN to provide an external service or a local service based on at least one of the NID and the list of SN-IDs.

Example 14 is the method of Example 13, wherein for the external service, selecting the NPN is based on both the NID and a supported SN-ID in the list that matches a prioritized SN-ID configured in the UE.

Example 15 is the method of Example 13, wherein for the local service, selecting the NPN is based on the NID.

Example 16 is the method of Example 15, wherein selecting the NPN is further based on one or more of a data network name (DNN), single network slice selection assistance information (S-NSSAI), and session and service continuity (SSC) mode information.

Example 17 is the method of Example 13, wherein the NPN indicator is configured to indicate a non-public network selection procedure type comprising an external service type and a local service type.

Example 18 is the method of Example 13, wherein the NID is configured to indicate whether the NPN supports the external service or only the local service.

Example 19 is the method of Example 13, further comprising establishing a connection to the NPN and performs a corresponding authentication procedure.

Example 20 is the method of Example 13, wherein the external service is provided by a service network of a mobile network operator (MNO) providing public land mobile network (PLMN) services, and wherein a selected SN-ID in the list indicates support of the MNO with a PLMN identifier (PLMN-ID) format.

Example 21 is the method of Example 13, wherein the external service is provided by a service network of a non-mobile network operator (non-MNO), and wherein a selected SN-ID in the list comprises a domain name corresponding to the service network.

Example 22 is a product comprising one or more tangible computer-readable non-transitory storage media comprising computer-executable instructions operable to, when executed by at least one baseband processor, enable the at least one baseband processor to perform the method of any one of Example 13 to Example 21.

Example 23 is a system comprising means for establishing a connection between a User Equipment (UE) device and a non-public network (NPN) based on NPN configuration information stored on the UE device and NPN service information broadcast by a radio access node (RAN) of the NPN indicating services supported by the NPN.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A non-transitory computer-readable storage medium, the non-transitory computer-readable storage medium including instructions that when executed by a processor, cause the processor to:
generate a non-public network identifier (NID) configured to identify a non-public network and to indicate support of either an external service network or a local service;
generate a list of supported external service networks, wherein the list comprises a plurality of service network identifiers (SN-IDs) corresponding to respective external service networks in the list, wherein a first SN-ID of the plurality of SN-IDs in the list with a PLMN identifier (PLMN-ID) format indicates support of a mobile network operator (MNO) providing PLMN services, and wherein a second SN-ID of the plurality of SN-IDs in the list comprises a domain name indicating support of a non-MNO; and
broadcast information comprising the NID, the list of supported external service networks, and a non-public network indicator to differentiate between the non-public network and a public land mobile network (PLMN).

2. The non-transitory computer-readable storage medium of claim 1, wherein to broadcast the information comprises to include the information in a system information block (SIB).

3. The non-transitory computer-readable storage medium of claim 1, wherein to broadcast the information comprises to configure a reserved globally unique PLMN identifier (PLMN-ID).

4. The non-transitory computer-readable storage medium of claim 1, wherein the instructions further configure the processor to provide local services to one or more user equipments (UEs) registered with the non-public network.

5. An apparatus for a non-public network, the apparatus comprising:
a memory interface to send or receive, to or from a memory device, data corresponding to a list of supported external service networks; and
a processor to:
generate a non-public network identifier (NID) configured to identify the non-public network and to indicate support of either an external service network or a local service;
generate the list of supported external service networks, wherein the list comprises a plurality of service network identifiers (SN-IDs) corresponding to respective external service networks in the list, wherein a first SN-ID of the plurality of SN-IDs in the list with a PLMN identifier (PLMN-ID) format indicates support of a mobile network operator (MNO) providing PLMN services, and wherein a second SN-ID of the plurality of SN-IDs in the list comprises a domain name indicating support of a non-MNO; and
broadcast information comprising the NID, the list of supported external service networks, and a non-public network indicator to differentiate between the non-public network and a public land mobile network (PLMN).

6. The apparatus of claim 5, wherein to broadcast the information comprises to include the information in a system information block (SIB).

7. The apparatus of claim 5, wherein to broadcast the information comprises to configure a reserved globally unique PLMN identifier (PLMN-ID).

8. The apparatus of claim 5, wherein the processor is further configured to provide local services to one or more user equipments (UEs) registered with the non-public network.

9. A method for a user equipment (UE), comprising:
scanning frequency bands for a wireless wide area network (WWAN) and a non-public network (NPN);
detecting a cell that supports the NPN based on an NPN indicator broadcast by the cell;
in response to detecting the cell that supports the NPN, determining a network identifier (NID) for the NPN and a list comprising a plurality of service network identifiers (SN-IDs) supported by the NPN, wherein a first SN-ID of the plurality of SN-IDs in the list with a PLMN identifier (PLMN-ID) format indicates support of a mobile network operator (MNO) providing PLMN services, and wherein a second SN-ID of the plurality of SN-IDs in the list comprises a domain name indicating support of a non-MNO; and
selecting the NPN to provide an external service or a local service based on at least one of the NID and the list of SN-IDs.

10. The method of claim 9, wherein for the external service, selecting the NPN is based on both the NID and a supported SN-ID in the list that matches a prioritized SN-ID configured in the UE.

11. The method of claim 9, wherein for the local service, selecting the NPN is based on the NID.

12. The method of claim 11, wherein selecting the NPN is further based on one or more of a data network name (DNN), single network slice selection assistance information (S-NSSAI), and session and service continuity (SSC) mode information.

13. The method of claim 9, wherein the NPN indicator is configured to indicate a non-public network selection procedure type comprising an external service type and a local service type.

14. The method of claim 9, wherein the NID is configured to indicate whether the NPN supports the external service or only the local service.

15. The method of claim 9, further comprising establishing a connection to the NPN and performs a corresponding authentication procedure.

* * * * *